United States Patent
Wahl

(10) Patent No.: US 7,934,258 B2
(45) Date of Patent: Apr. 26, 2011

(54) SYSTEM AND METHOD FOR REMOTE AUTHENTICATION SECURITY MANAGEMENT

(75) Inventor: Mark Frederick Wahl, Austin, TX (US)

(73) Assignee: Informod Control Inc., Austin, TX (US)

( * ) Notice: Subject to any disclaimer, the term of this patent is extended or adjusted under 35 U.S.C. 154(b) by 919 days.

(21) Appl. No.: 11/893,954

(22) Filed: Aug. 17, 2007

(65) Prior Publication Data

US 2008/0046989 A1 Feb. 21, 2008

Related U.S. Application Data

(60) Provisional application No. 60/838,520, filed on Aug. 17, 2006.

(51) Int. Cl.
- *G06F 11/00* (2006.01)
- *G06F 12/14* (2006.01)
- *G06F 12/16* (2006.01)
- *G08B 23/00* (2006.01)
- *G06F 21/00* (2006.01)

(52) U.S. Cl. .......................... 726/23; 713/184
(58) Field of Classification Search .............. 726/22–24; 713/186
See application file for complete search history.

(56) References Cited

U.S. PATENT DOCUMENTS

| | | | | |
|---|---|---|---|---|
| 4,719,566 A * | 1/1988 | Kelley | ......................... | 340/5.27 |
| 6,981,155 B1 * | 12/2005 | Lyle et al. | ....................... | 726/22 |
| 7,082,535 B1 * | 7/2006 | Norman et al. | ............... | 713/163 |
| 7,171,555 B1 * | 1/2007 | Salowey et al. | ............... | 713/156 |
| 7,356,844 B2 * | 4/2008 | Lyle et al. | ........................ | 726/23 |
| 7,421,503 B1 * | 9/2008 | Stieglitz et al. | ............... | 709/229 |
| 7,424,735 B2 * | 9/2008 | Sorkin et al. | ....................... | 726/4 |
| 7,526,808 B2 * | 4/2009 | Lynn et al. | ....................... | 726/23 |
| 7,725,937 B1 * | 5/2010 | Levy | ................................ | 726/23 |
| 2004/0255167 A1 | 12/2004 | Knight | | |
| 2005/0108568 A1 | 5/2005 | Bussiere et al. | | |
| 2006/0101515 A1 | 5/2006 | Amoroso et al. | | |
| 2008/0018927 A1 * | 1/2008 | Martin et al. | ................ | 358/1.15 |

OTHER PUBLICATIONS

B. Aboba et al. RFC 3748: Extensible Authentication Protocol (EAP). Jun. 2004. IEEE. p. 1-68.*
Cheswick, "An Evening with Berferd", USENIX proceedings, Jan. 20, 1990, p. 1.
Aboba and Calhoun, "Radius Support For Extensible Authentication Protocol (EAP)", Request for Comments 3579, Internet Engineering Task Force, Sep. 2003, p. 18.

* cited by examiner

*Primary Examiner* — Christian LaForgia

(57) ABSTRACT

An information processing system for remote access comprising a network access server and an authentication server is augmented with the ability to provide a simulated authentication process for authentication requests from attackers which do not correspond to authorized user names. Attackers whose requests form a password guessing attack for a user identity selected from a set of reject user names are redirected to a honeypot server.

2 Claims, 11 Drawing Sheets

KNOWN USERS TABLE

140 {
| USERNAME | PASSWORD | FILTER | STATUS |
|---|---|---|---|
|  |  |  |  |

FIG. 5

REJECT USERS TABLE

200 {

| USERNAME | PASSWORD | BEHAVIOR |
|----------|----------|----------|
|          |          |          |

FIG. 7

SYSTEM AND METHOD FOR REMOTE AUTHENTICATION SECURITY MANAGEMENT

CROSS-REFERENCE TO RELATED APPLICATIONS

This application claims the benefit of PPA Ser. No. 60/838,520 filed Aug. 17, 2006 by the present inventor, which is incorporated by reference.

FEDERALLY SPONSORED RESEARCH

Not applicable

SEQUENCE LISTING OR PROGRAM

Not applicable

BACKGROUND OF THE INVENTION

1. Field of Invention

This invention relates generally to management of network access credentials in enterprise computer networks.

2. Prior Art

An organization that operates an intranet, an internal network based on Internet protocols, may wish to allow remote access to that intranet from users, such as employees, customers, partners, or other categories of users, who are using computing clients that are not attached to that intranet, but are instead attached to the Internet or to a wireless network.

A remote access deployment typically comprises a network access server (50) that accepts incoming connection requests from supplicants (40), clients operated by users outside the organization, and sends the user's authentication credentials (such as a username and password) from that request to a Remote Authentication Dial In User Service (RADIUS) authentication server (52), using the RADIUS protocol as specified in the document "Remote Authentication Dial in User Service (RADIUS)" by C. Rigney et al of June 2000. The RADIUS server is responsible for comparing the user's credentials from the request with the credentials for the user that are stored in a database of authorized users (54). The RADIUS server will log whether the authentication was successful or unsuccessful, and respond to the network access server. If the authentication process is successful, then the network access server will permit the user to connect to other servers in the organization's intranet (48), by configuring the external access firewall for the organization (44) with rules that allow the user's client to make connections to servers on the intranet.

As with many servers with an Internet connection, an organization's network access server may be detected by attackers trying random Internet Protocol (IP) addresses or performing port scans to discover open services. Once the IP address and protocol type (e.g., SSH, IPSec) of a network access server has been discovered by an attacker, the attacker may attempt a password guessing attack, with the goal of finding a username and password that the network access server will allow, so that the attacker can gain access to other servers on that organization's Intranet. Similarly, a network access server that is attached to a publicly-reachable wireless network may be detected by an attacker, who will attempt a password guessing attack.

There are two typical patterns of password guessing attack. One approach is for the attacker to try many hundreds or thousands of common names (e.g., "joe", "smith") as account names, with a few likely passwords tried for each name. The other approach is for the attacker to restrict password guessing to a few widely used account names (e.g., "root", "Administrator") with many possible passwords tried for these accounts.

The cost to the attacker of sending the attack is low—the attacker might need only to establish a connection to the target network access server, send a packet, wait for a response, and close the connection. An attacker may try several thousand possible username and password combinations in a short period of time by using an automated script that sends the attack packets from a dial-up Internet account, or from one or more computers that have already been compromised.

While the goal of the attacker in password guessing is to determine access credentials that grant the attacker rights to access other services, even if the goal of the attacker is not an explicit denial-of-service attack, the many thousands of failed authentications resulting from the attack will typically be logged in one of the network access server or authentication server log files or databases. The organization's network administrator must process this log in order to determine if any of the attacks are successful, and remove the bulk uninteresting information of failed attempts.

BACKGROUND OF THE INVENTION

Objects and Advantages

It is an advantage of this invention over the prior art that attempts by attackers to infiltrate the network by using well-known usernames (such as "Administrator" or "root") are detected; these attempts are not included in the logs of legitimate access attempts, and the attackers are led to believe their password guessing attempts have been successful by redirecting their connection to an isolated honeypot which simulates a network service.

SUMMARY

In order to reduce the amount of work the network administrator of an organization must perform to manage the organization's network access servers, and to decrease the possibility of an attacker compromising the network access control function, this invention defines and implements a new component of a remote access system for remote authentication security management. The authentication server forwards requests comprising authentication attempts which are for users who are not in the set of known users to a malicious access detection component. Those requests that appear to be part of a password guessing attempt are not recorded in the log, and selected requests for password guessing attacks are indicated to the attacker to be 'successful', by permitting the attacker to connect to a honeypot system. A honeypot system typically comprises a computer system, either real, "virtual" or emulated, with little to no access controls, and no valuable data or services. A honeypot misleadingly appears to an attacker as a system that provides some valuable service or stores valuable files. This further delays the attack by diverting the attacker into studying the honeypot.

DRAWINGS

Figures

FIG. 5 is a diagram illustrating the contents of the authentication server database component (24).

FIG. 7 is a diagram illustrating the contents of the malicious access detection database component (30).

Figure 1:
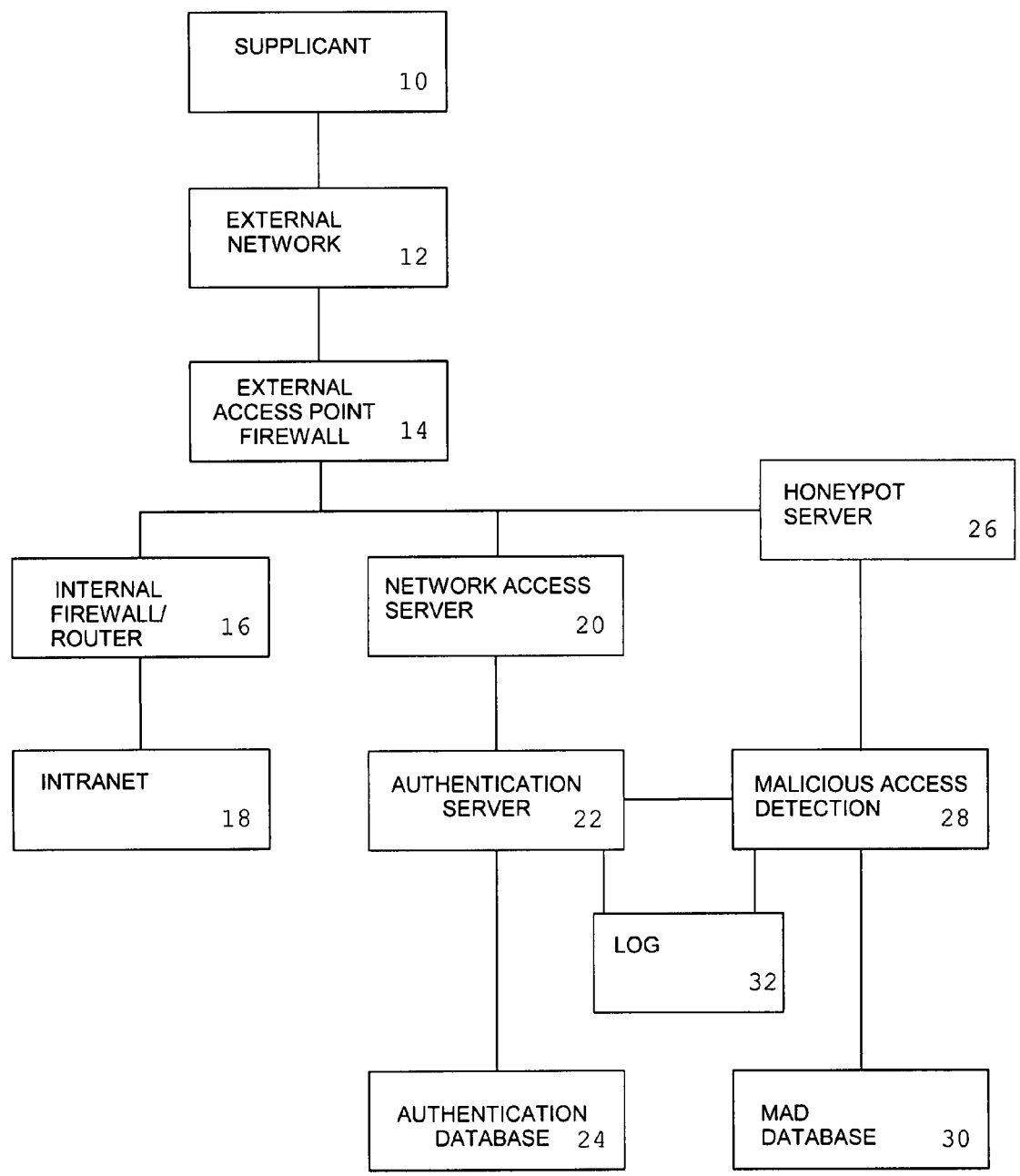
FIG. 1 is a diagram illustrating the components of the system for remote authentication security management.
Figure 2:
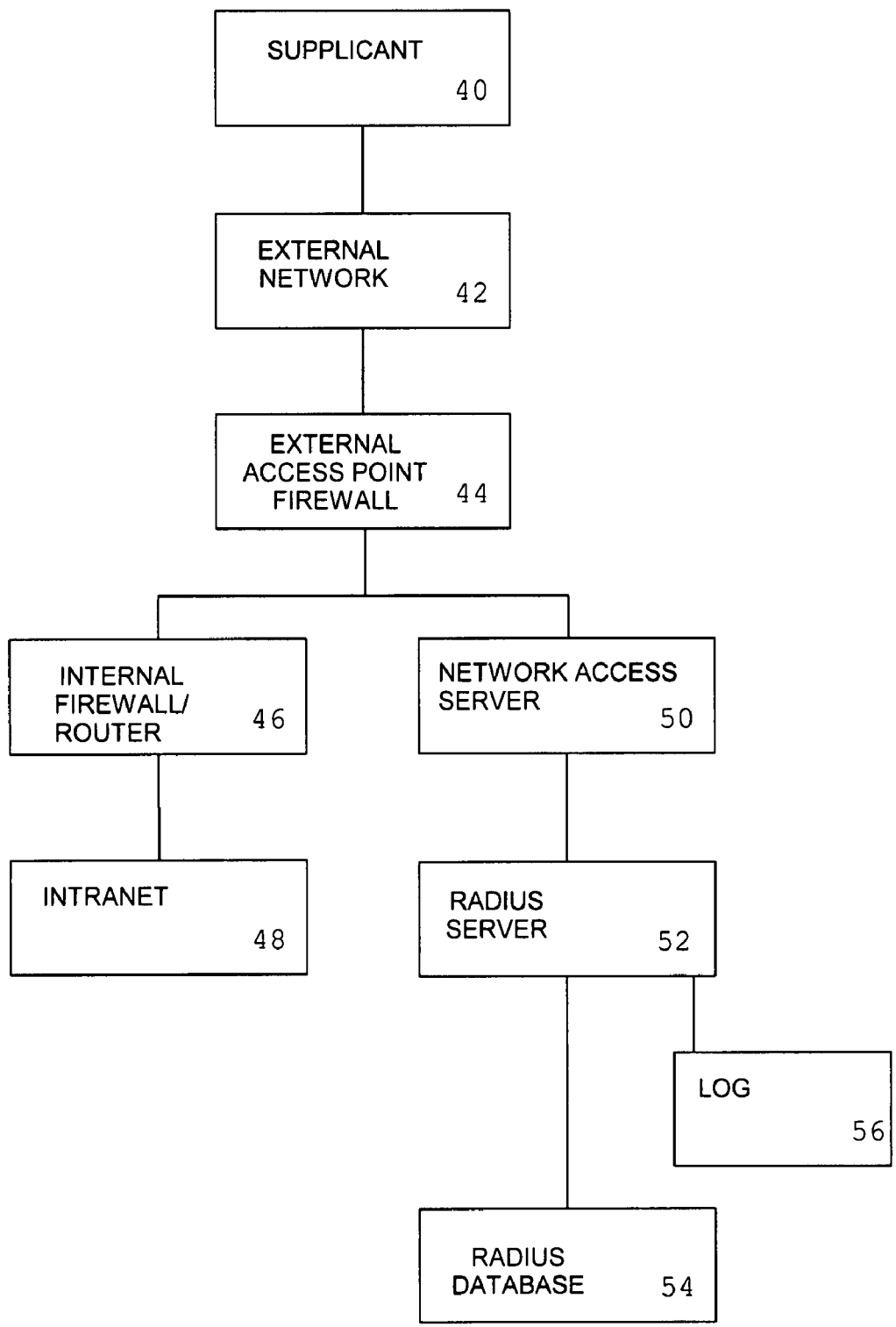
FIG. 2 is a diagram illustrating the components of the prior art.

REFERENCE NUMERALS 10 supplicant component
12 external network
14 external access point firewall component
16 internal firewall/router component
18 intranet
20 network access server component
22 authentication server component
24 authentication server database component
26 honeypot server component
28 malicious access detection server component
30 malicious access detection database component
32 log
40 supplicant component
42 external network
44 external access point firewall component
46 internal firewall/router component
48 intranet
50 network access server component
52 RADIUS server component
54 RADIUS server database component
56 log
140 known users table
200 reject users table
220 supplicant computer
222 wireless network
224 wireless network access point
226 internal firewall/router
228 intranet network switch
230 RADIUS server computer
232 RADIUS server database
234 honeypot server computer
236 malicious access detection computer
238 database
240 DMZ switch
250 computer
252 CPU
254 hard disk interface
256 system bus
258 BIOS ROM
260 hard disk
262 operating system state on hard disk
264 application state on hard disk
266 random access memory
268 operating system state in memory
270 application state in memory
272 network interface
274 LAN switch
380 wireless access point
382 CPU
384 flash memory
386 system bus
388 random access memory
390 wireless network interface
392 network interface
394 LAN switch
396 antenna

DETAILED DESCRIPTION

The invention comprises the following components:
a supplicant component (10),
an external access point firewall component (14),
a network access server component (20),
an authentication server component (22),
an authentication server database component (24),
a honeypot server component (26),
a malicious access detection server component (28), and
a malicious access detection database component (30).

The supplicant component (10) is a software component that sends an authentication request to the external access point firewall component (14). The authentication request may be sent to the external access point firewall within the Extensible Authentication Protocol (EAP), the Secure Shell protocol (SSH), or the HyperText Transfer Protocol (HTTP) over the Secure Sockets Layer (SSL). The Extensible Authentication Protocol is specified in the document "Extensible Authentication Protocol (EAP)" by B. Aboba et al of June 2004. The Secure Shell protocol is specified in the document "The Secure Shell (SSH) Authentication Protocol", by T. Ylonen et al of January 2006. The HyperText Transport Protocol is specified in the document "Hypertext Transfer Protocol—HTTP/1.1" by R. Fielding et al of June 1999. The Secure Sockets Layer is specified in the document "The Transport Layer Security (TLS) Protocol Version 1.1" by T. Dierks et al of April 2006.

The external access point firewall component (14) is a software component that filters packets being transferred to or originating from an external network (12). When an incoming connection request is received at the external access point firewall component from a supplicant (10), the firewall will communicate with a network access server (20). If the network access server grants the supplicant access, then the firewall will enable a set of filtering rules to permit communication with that supplicant to either the intranet (18) or the honeypot server (26).

Figure 3:
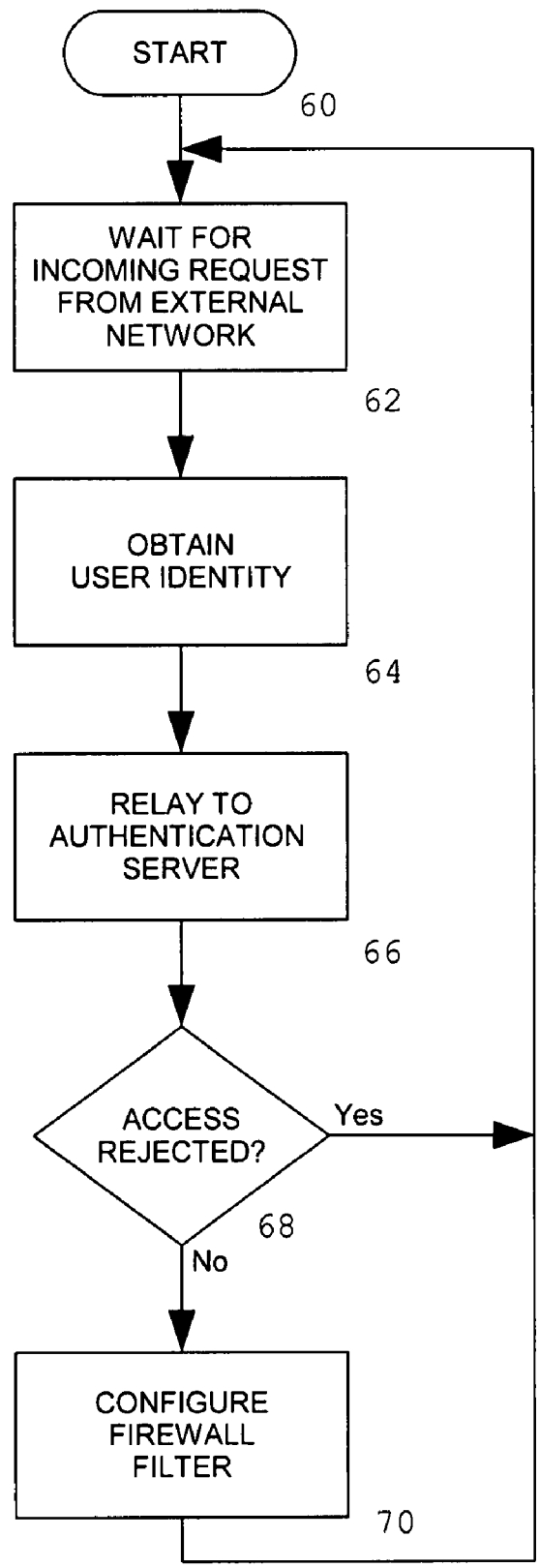
FIG. 3 is a flowchart that illustrates the algorithm of the network access server component (20).

The network access server component (20) is a software component that implements a RADIUS client for the external access point firewall (14). The operation of this component is illustrated by the flowchart of FIG. 3.

Figure 4A:
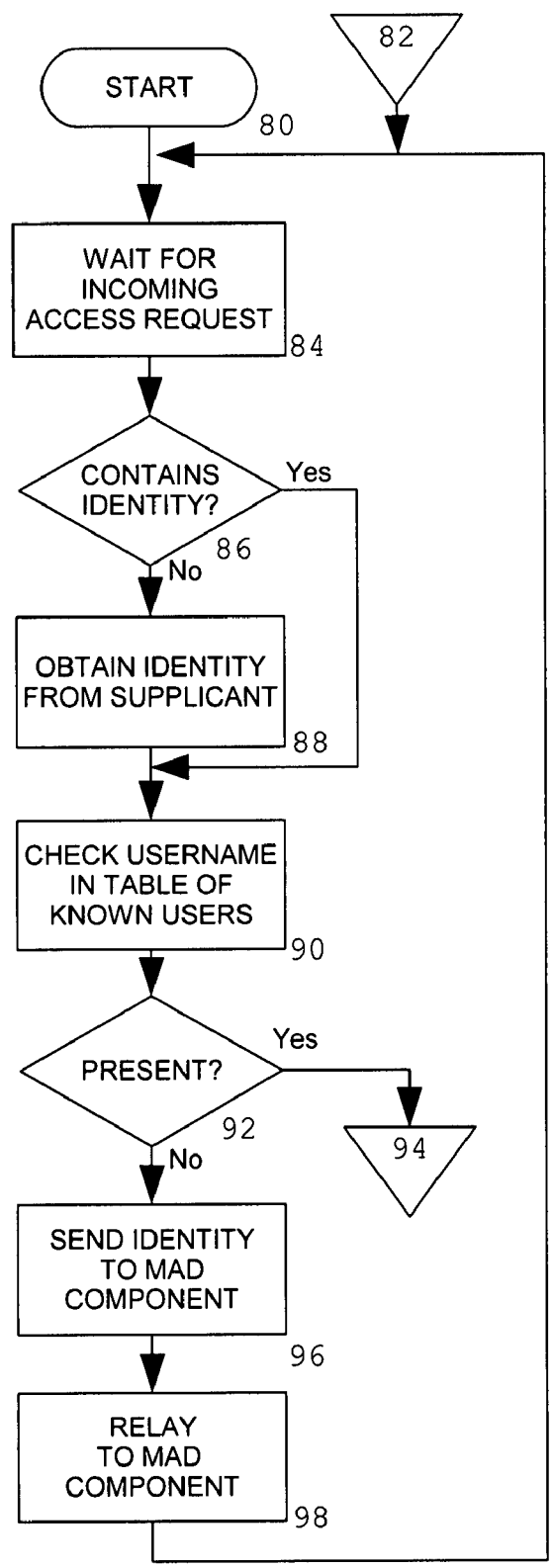
FIG. 4A and FIG. 4B are a flowchart that illustrates the algorithm of the authentication server component (22).
Figure 4B:
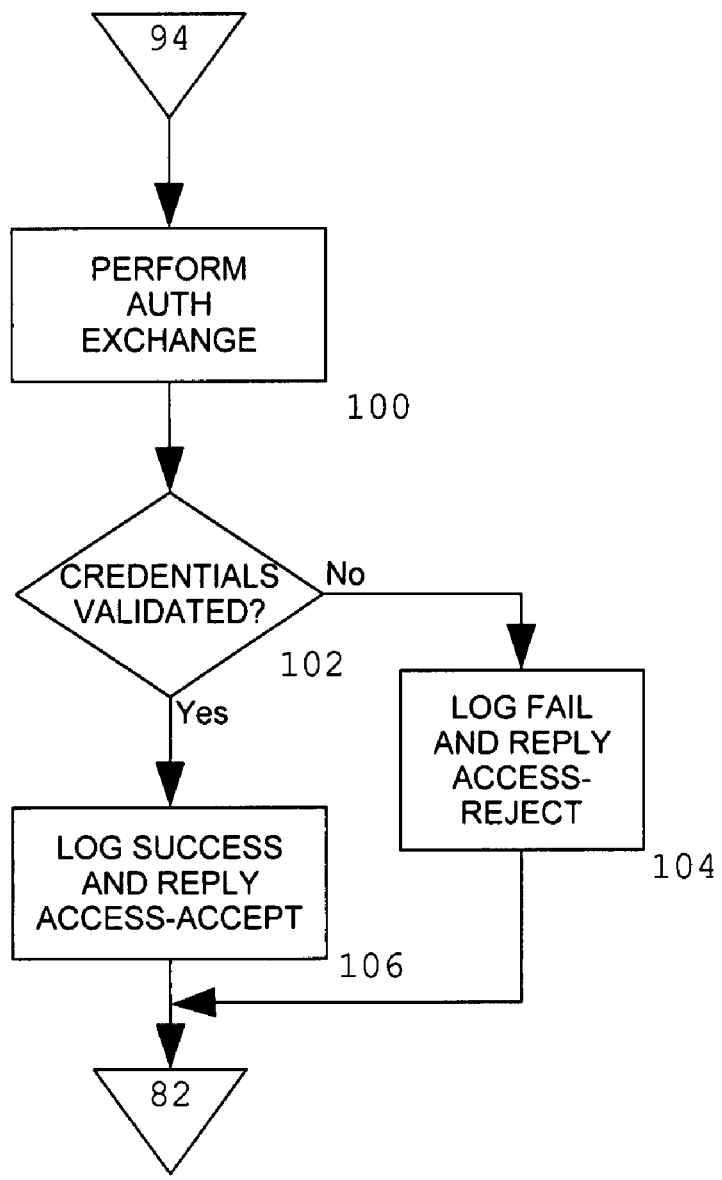

The authentication server component (22) is a software component that authenticates authorized users on behalf of the network access server component (20). For authentication requests with user identities that are not registered users, the authentication server forwards the authentication interaction to the malicious access detection server component (28). The operation of this component is illustrated by the flowchart of FIG. 4A and FIG. 4B.

The authentication server database component (24) is a software component that maintains the persistent state of the authentication server (22). The authentication server database can be implemented as a relational database, which comprises one table: the known users table (140). The structure of this database is illustrated by the diagram of FIG. 5. The authentication server database can also be implemented as a directory server providing a directory access protocol service, such as the Lightweight Directory Access Protocol, as defined in the document "Lightweight Directory Access Protocol (v3)" by M. Wahl et al of December 1997.

There is one row in the known users table (140) for each authorized user. Rows in this table are created by the network administrator. The primary key of this table is the USERNAME column. The columns of this table are:

USERNAME: a string containing a unique identifier for the user,

PASSWORD: the authentication password for the user,

STATUS: an indication of the validity status of this row, and

FILTER: the packet filtering rules which the external access point firewall (14) should apply for connections from this user.

Figure 6:
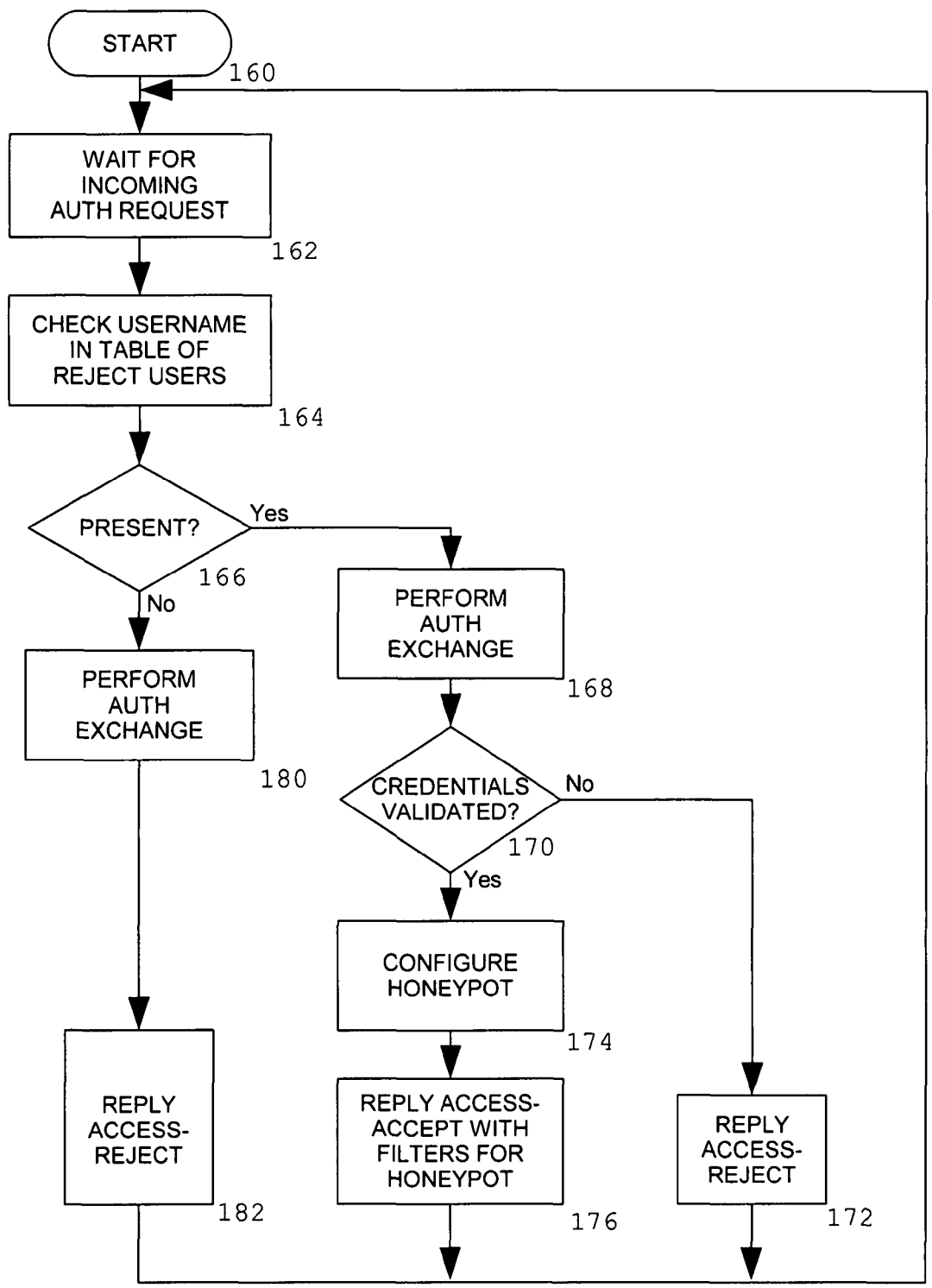
FIG. 6 is a flowchart that illustrates the algorithm of the malicious access detection server component (28).

The honeypot server component (26) is a software component that emulates the network behavior of a server without providing the anticipated functions of that server. The operations of a honeypot are described in the papers "An Evening with Berferd" by B. Cheswick et al of 1991, and "There Be Dragons" of S. Bellovin of 1992. To further slow an attacker, the honeypot will be configured to exhibit different behavior for each user, as this will make it harder for automated attack tools to detect when interacting with a honeypot. In particular, the honeypot can be configured to emulate one of a set of typical operating systems (e.g., Windows, Linux, or Solaris), as well as offer different services (e.g. web server, file server, print server). This selected behavior is specified in the table of reject users (200), The malicious access detection server component (28) is a software component that handles authentication interactions for supplicants which have provided as their identity a username which is not included in the known users table. The operation of this component is illustrated by the flowchart of FIG. 6.

The malicious access detection database component (30) is a software component that maintains the persistent state of the malicious access detection server component (28). The malicious access detection database can be implemented as a relational database, which comprises one table: the reject users table (200). The structure of this database is illustrated by the diagram of FIG. 7. The malicious access detection database can also be implemented as a directory server providing a directory access protocol service, such as the Lightweight Directory Access Protocol, as defined in the document "Lightweight Directory Access Protocol (v3)" by M. Wahl et al of December 1997.

There is one row in the reject users table (200) for each identity that is to be redirected to the honeypot server (26). Rows in this table are created by the network administrator: the table contains one row for each user identity that is not a valid user identity but is frequently provided by an attacker attempting to gain access by guessing a username and password. A set of names suitable for use in a reject users table can be obtained by monitoring incoming SSH login requests to an SSH server on the Internet. The primary key of this table is the USERNAME column. The columns of this table are:

USERNAME: a string containing a unique identifier typically provided by attackers attempting to guess passwords of remote access systems, each value a string of a common username such as "joe", "smith", "root", or "Administrator", PASSWORD: an authentication password that is a string that is anticipated to be easy for an attacker to guess but randomly assigned to the row, and BEHAVIOR: an indicator of the honeypot behavior to configure when an attacker uses the identity described by this row.

The processing components of this invention can be implemented as application software running on one or more server computer systems on an enterprise network.

Figure 8:
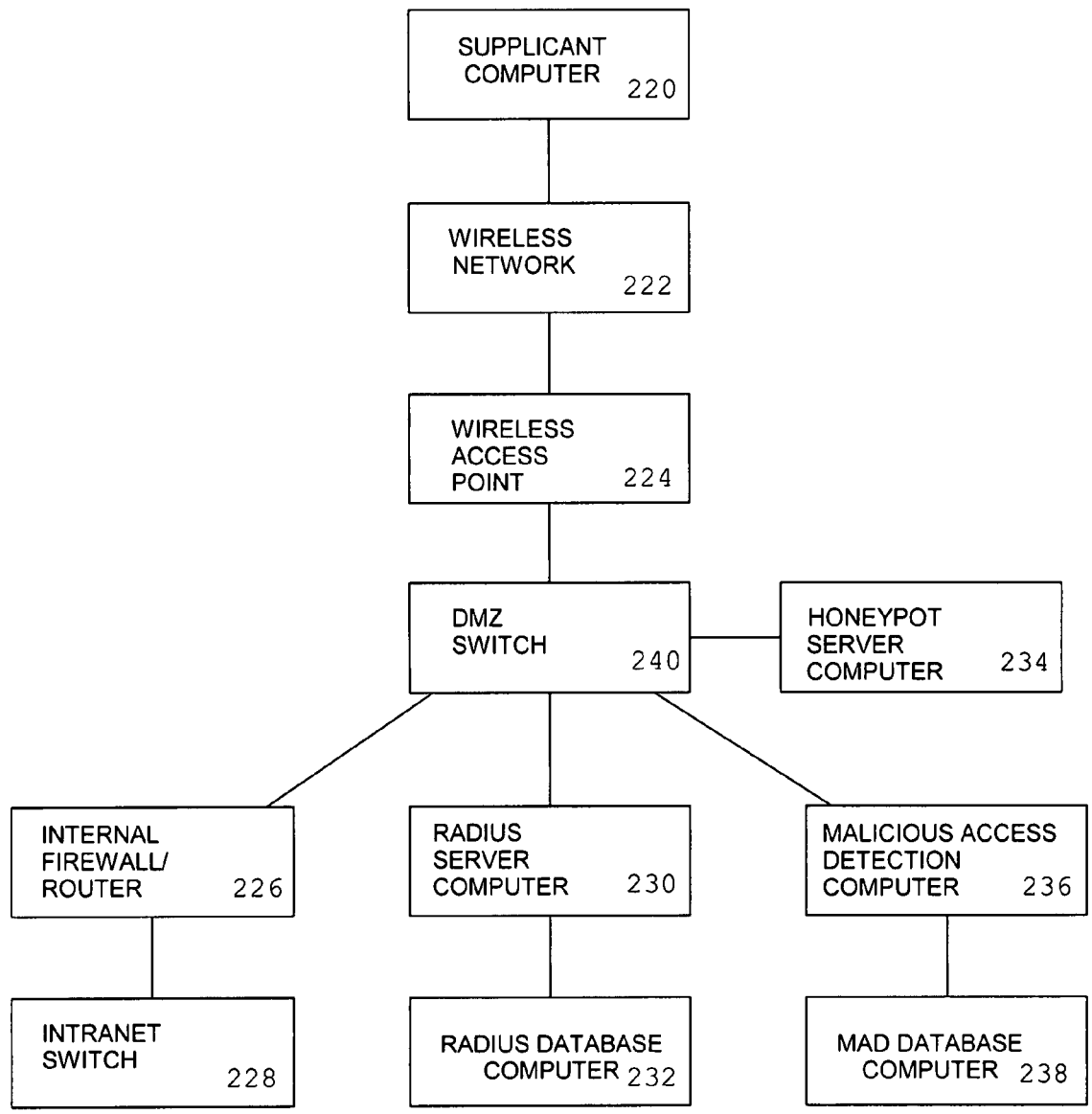
FIG. 8 is a diagram illustrating the components of the system for remote authentication security management in a wireless network.

The diagram of FIG. 8 illustrates an example computer network in which an organization provides a wireless network in addition to an intranet. The supplicant computer (220) connects over a wireless network (222) to a wireless network access point (224). The wireless access point (224), a honeypot server computer (234), an internal firewall/router (226), a RADIUS server computer (230) and a malicious access detection computer (236) are connected to a DMZ switch (240). The internal firewall/router (226) restricts access from the DMZ switch to the intranet switch (228). The RADIUS server computer (230) connects to a RADIUS database computer (232), and the malicious access detection computer (236) connects to a MAD database computer (238). The supplicant software component (10) can be implemented as software running on the supplicant computer (220). The wireless access point implements a wireless networking protocol, such as the protocol specified in IEEE Std. 802.11b-1999, "Higher Speed PHY Extension in the 2.4 GHz Band". The external access point firewall component (14) and network access server component (20) can be implemented as software components running on the wireless network access point (224). The honeypot server component (26) can be implemented as a software component run on the honeypot server computer (234). The authentication server component (22) can be implemented as software running on the RADIUS server computer (230). The authentication server database component (24) can be implemented as software running on the RADIUS database computer (232). The malicious access detection server component (28) can be implemented as software running on the malicious access detection computer (238). The MAD database component (30) can be implemented as software running on the MAD database computer (238). The log component (38) can be implemented as files on the RADIUS server computer (230) and the malicious access detection computer (238).

Figure 9:
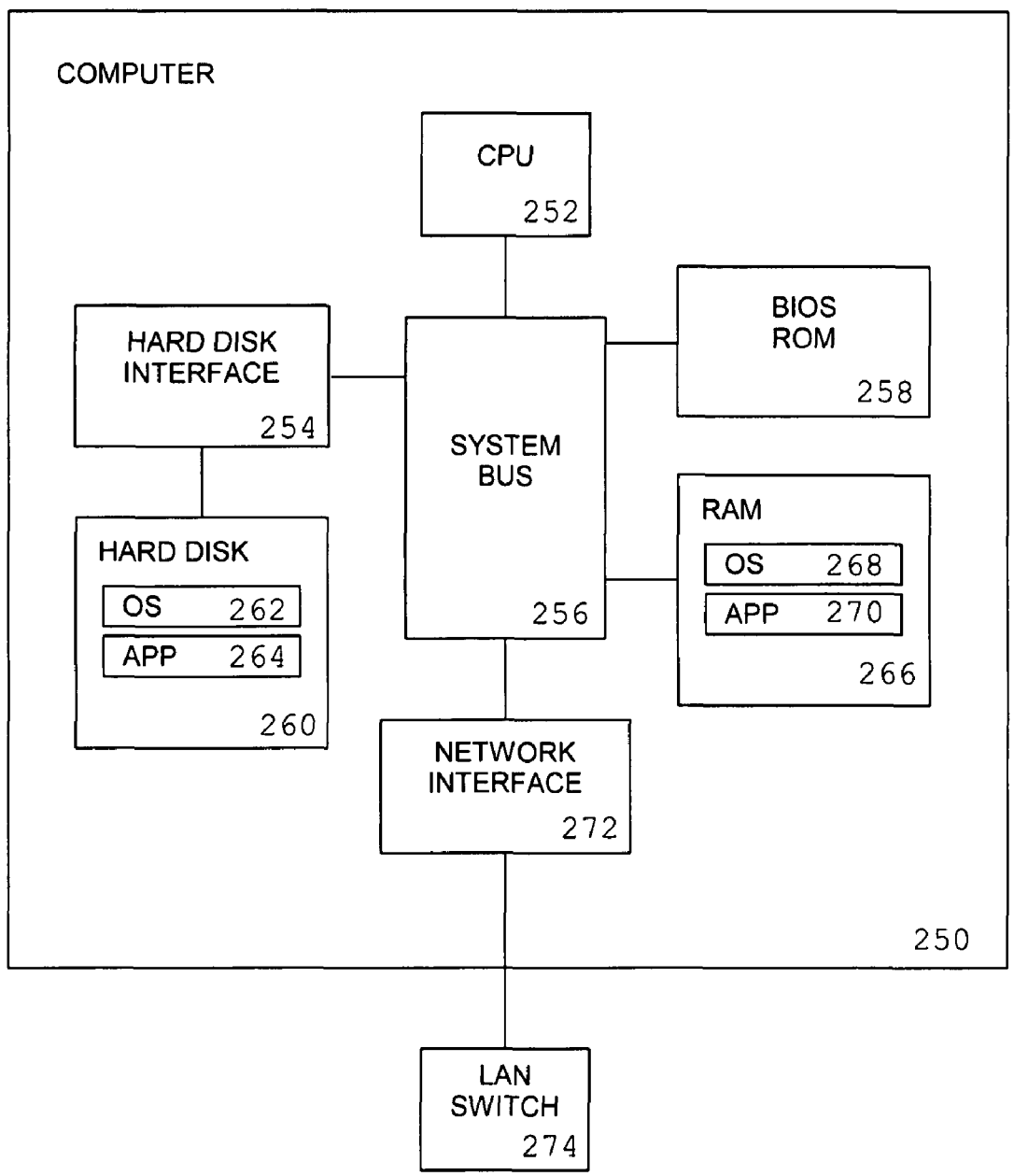
FIG. 9 is a diagram illustrating the typical components of a server computer.

FIG. 9 illustrates the typical components of a server computer (250). Components of the computer include a CPU (252), a system bus (256), a hard disk interface (254), a hard disk (260), a BIOS ROM (258), random access memory (266), and a network interface (272). The network interface connects the computer to a local area network switch (274). The hard disk (260) stores the software and the persistent state of the operating system (262) and applications (264) installed on that computer. The random access memory (266) holds the executing software and transient state of the operating system (268) and application processes (270).

Figure 10:
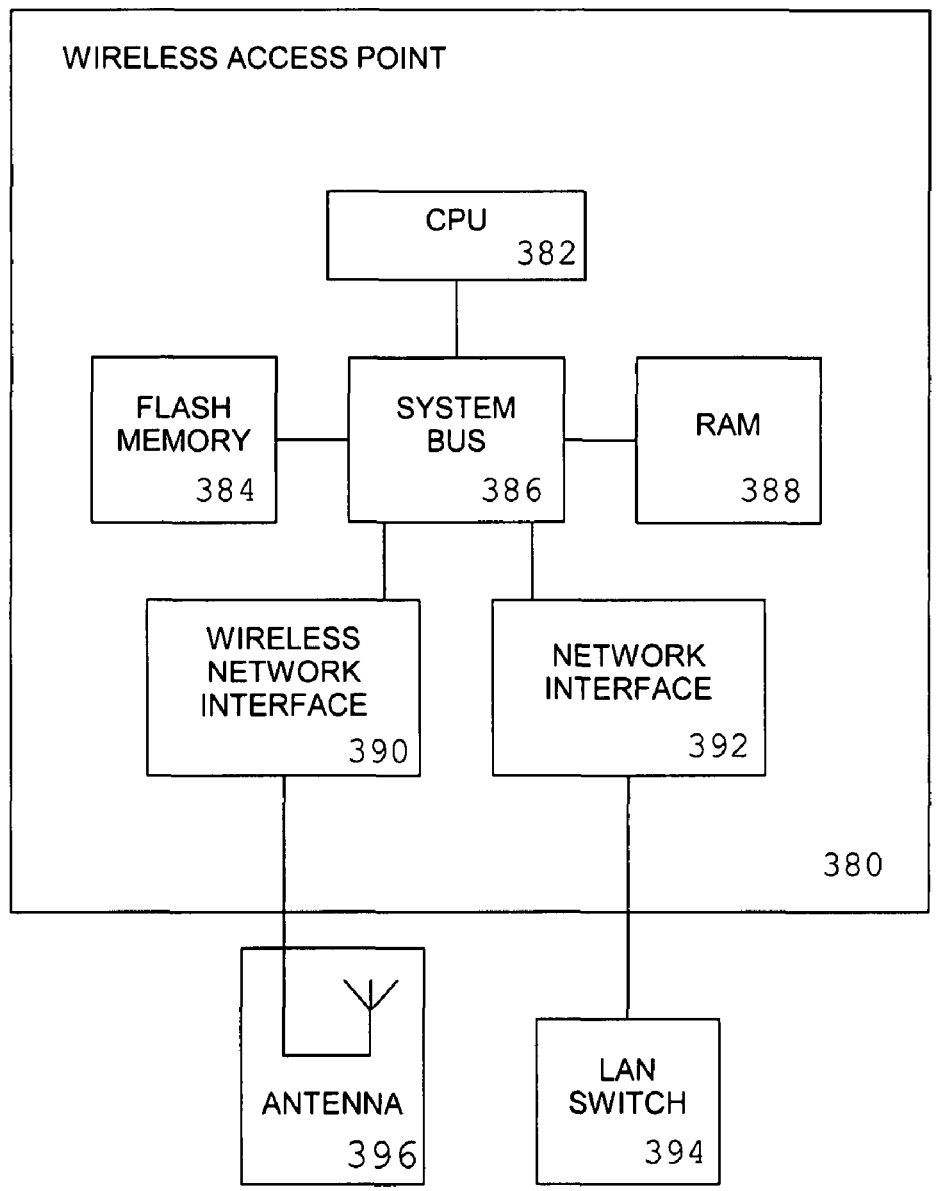
FIG. 10 is a diagram illustrating the typical components of a wireless access point.

The diagram of FIG. 10 illustrates the typical components of a wireless network access point (380). Components of a wireless network access point include a CPU (382), a system bus (386), a flash memory (384), a random access memory (388), a network interface (392) and a wireless network interface (390). The network interface (392) connects the wireless network access point to a local area network switch (394). The wireless network interface (390) is connected to an antenna (396).

Operations

The network access server component (20) comprises one or more threads of processing. The behavior of each thread is illustrated by the flowchart of FIG. 3.

At step 62, a thread will wait for an incoming request from a supplicant on the external network, which will be provided to the network access server component by the external access point firewall (14). If there is more than one thread present in the component waiting at this step, then a request is provided to exactly one thread, and that thread handles all subsequent interactions corresponding to that request. At step 64, the thread will obtain the user identity from the request. If the network access server implements EAP, then the network access server will send an EAP-Request/Identity packet, and the supplicant will respond with an EAP-Response/Identity packet. If the network access server implements SSH, then the supplicant provides the user name in the SSH authentication request. If the network access server implements HTTP over TLS, then the supplicant provides the user name in a value of an HTML form control in a content of Content Type application/x-www-form-urlencoded in an HTTP POST request, as described in section 17.13.4 of the document "HTML 4.01 Specification" by D. Raggett et al of December 1999. At step 66, the thread will interact with the authentication server. The thread will send an RADIUS Access-Request packet to the authentication server. The thread will then wait for a packet from the authentication server in response to that request. If the network access server implements EAP and the packet from the authentication server is an Access-Challenge packet, then the thread will extract the EAP-Message attribute from the Access-Challenge packet, send the value of that attribute to the supplicant, and sent the response from the supplicant to the authentication server in an Access-Request packet. At step 68, if the authentication server rejected the authentication request by responding with an Access-Request, then the thread will loop back to wait for another request. Otherwise, if the authentication server responded with an Access-Accept, then at step 70, the thread will configure the firewall (14) with packet filter rules to allow the supplicant to access either the intranet (18) or the honeypot server (26), as specified in the response from the authentication server. The filter rule set is identified by the attribute Filter-Id, defined in section 5.11 of the document "Remote Authentication Dial In User Service (RADIUS)" by C. Rigney et al of June 2000. The thread will then loop back to wait for another request.

The authentication server component (22) comprises one or more threads of processing. The behavior of each thread is illustrated by the flowchart of FIG. 4A and FIG. 4B.

At step 84, a thread will wait for an Access-Request packet from the network access server component (20). If there is more than one thread present in the component waiting at this step, then a request is provided to exactly one thread, and that thread handles all subsequent interactions corresponding to that request. At step 86, the thread will check whether the request includes the identity of the user, by searching the attribute list of the Access-Request packet for the User-Name attribute or for a EAP-Message attribute containing an encapsulated EAP-Response/Identity packet. If the user name was not supplied, then at step 88 the thread will obtain the user identity from the supplicant, by sending an Access-Challenge packet to the Network Access Server and awaiting a subsequent Access-Request packet containing a user name. At step 90, the thread will search the known users table (140) for a row in which the value of the USERNAME column matches this user name.

If a row was found in the known users table, then at step 100 the thread will perform authentication by comparing the credentials supplied by the user in an Access-Request with those stored in the row. If the credentials supplied by the supplicant during the authentication exchange are validated as corresponding to those stored in the row for that user, then at step 106 the thread will add a success message to the log (32) and respond to the network access server with an Access-Accept packet, in which the Access-Accept packet contains a Filter-Id attribute that allows the supplicant access to the intranet, in which the value of the attribute is obtained from the value of the FILTER column in the row in the known users table. If the credentials were not validated, then at step 104 the thread will add a failure message to the log (32) and will respond to the network access server with an Access-Reject packet. The thread will then loop back to step 84.

If a row was not found in the known users table, then at step 96 the thread will send the user name in a new Access-Request packet to the malicious access detection server component (28), and at step 98 the thread will relay packets between the malicious access detection component and the network access server. Once the malicious access detection component returns a RADIUS packet of Access-Accept or Access-Reject, then the thread will loop back to step 84.

The malicious access detection server component (28) comprises one or more threads of processing. The behavior of each thread is illustrated by the flowchart of FIG. 4A and FIG. 4B.

At step 162, a thread will wait for an Access-Request packet from the authentication server component (22). If there is more than one thread present in the component waiting at this step, then a request is provided to exactly one thread, and that thread handles all subsequent interactions corresponding to that request. At step 164, the thread will search the reject users table (200) for a row in which the value of the USERNAME column matches the user name provided by the authentication server. If no rows were found, then at step 180 the thread will complete any pending challenge-response authentication exchange, at step 182 the thread will respond with an Access-Reject packet, and loop back to step 162. Otherwise, if a row was found, then at step 168 the thread will authenticate the user by checking the supplicant's supplied authentication credentials with the value of the PASSWORD column of the row from the reject users table (200). If the credentials did not match the password value from the PASSWORD column of the row from the reject users table (200), then at step 172 the thread will respond with an Access-Reject packet, and loop back to step 162. Otherwise, if the credentials match, then at step 174 the thread will configure the honeypot by sending the honeypot server (26) a request with the network parameters of the supplicant and the value of the BEHAVIOR column of the row from the reject users table (200). At step 176, the thread will respond with an Access-Accept packet in which the Access-Accept packet contains a Filter-Id attribute that allows the supplicant access to the honeypot server, and loop back to step 162.

CONCLUSIONS

Many different embodiments of this invention may be constructed without departing from the scope of this invention. While this invention is described with reference to various implementations and exploitations, and in particular with respect to systems for handling incoming authentication requests at an organization's network firewall and network access server, it will be understood that these embodiments are illustrative and that the scope of the invention is not limited to them.

What is claimed is

1. A method of managing an authentication request from an attacker, said method comprising;
    (a) transmitting said authentication request from a supplicant to a network access server,
    (b) transmitting said authentication request from said network access server to an authentication server,
    (c) determining whether to add a failure message to a log by validating that a user name from said authentication request is a member of a set of names of known users and said credential from said authentication request does not match a password corresponding to said member of said set of names of known users,
    (d) determining whether to connect said supplicant to a honeypot server by validating that said user name from said authentication request is a member of a set of names of reject users and said credential from said authentication request matches a password corresponding to said member of said set of names of reject users.

2. A non-transitory computer readable medium comprising a computer program product implemented as software on a computer for managing an authentication request from an attacker, said computer program product comprising:
    (a) instructions for receiving at a network access server said authentication request from a supplicant,
    (b) instructions for transmitting said authentication request from said network access server to an authentication server,
    (c) instructions for determining whether to add a failure message to a log by validating that a user name from said authentication request is a member of a set of names of known users and said credential from said authentication request does not match a password corresponding to said member of said set of names of known users,
    (d) instructions for determining whether to connect said supplicant to a honeypot server by validating that said user name from said authentication request is a member of a set of names of reject users and said credential from said authentication request matches a password corresponding to said member of said set of names of reject users.

* * * * *